US010108460B2

(12) United States Patent
Gopisetty et al.

(10) Patent No.: US 10,108,460 B2
(45) Date of Patent: Oct. 23, 2018

(54) METHOD AND SYSTEM FOR INTEGRATED DEPLOYMENT PLANNING FOR VIRTUAL APPLIANCES

(75) Inventors: Sandeep Gopisetty, Morgan Hill, CA (US); Madhukar R. Korupolu, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 2221 days.

(21) Appl. No.: 12/039,690

(22) Filed: Feb. 28, 2008

(65) Prior Publication Data

US 2009/0222560 A1    Sep. 3, 2009

(51) Int. Cl.
| | |
|---|---|
| *G06F 15/173* | (2006.01) |
| *G06F 9/50* | (2006.01) |
| *G06F 8/60* | (2018.01) |
| *G06F 9/455* | (2018.01) |

(52) U.S. Cl.
CPC .............. *G06F 9/5077* (2013.01); *G06F 8/60* (2013.01); *G06F 9/45558* (2013.01); *G06F 2009/45579* (2013.01)

(58) Field of Classification Search
CPC ........... G06F 2009/45579; G06F 8/601; G06F 9/45558; G06F 9/5077; G06F 8/60
USPC ..... 709/226, 223, 224; 718/1, 104; 711/165, 711/202; 717/174, 177, 172; 712/36; 715/736; 714/4.11; 705/52, 37, 39, 40
See application file for complete search history.

(56) References Cited

U.S. PATENT DOCUMENTS

| | | | |
|---|---|---|---|
| 5,274,807 A * | 12/1993 | Hoshen ................. G06F 3/0601 |
| 6,078,957 A * | 6/2000 | Adelman .......... H04L 29/12009 |
| | | | 709/224 |
| 6,389,432 B1 | 5/2002 | Pothapragada et al. |
| 6,745,207 B2 * | 6/2004 | Reuter et al. |
| 6,944,785 B2 * | 9/2005 | Gadir ................... G06F 11/2005 |
| | | | 714/4.11 |
| 7,269,696 B2 | 9/2007 | Muhlestein et al. |
| 7,293,154 B1 * | 11/2007 | Karr .................... G06F 11/2082 |
| | | | 711/202 |
| 7,373,451 B2 * | 5/2008 | Lam et al. ........................ 711/6 |

(Continued)

OTHER PUBLICATIONS

Covaci, S. et al., A Mobile Intelligent Agent Based Virtual Enterprise Support Environment, 6th Int'l Conf. on IS&N'99, Barcelona, Apr. 1999 Proc., pp. 537-549.

(Continued)

*Primary Examiner* — Tien C Nguyen
(74) *Attorney, Agent, or Firm* — Sherman IP LLP; Kenneth L. Sherman; Steven Laut

(57) ABSTRACT

A method and system for integrated server-storage deployment planning for virtual appliances is provided. One implementation involves determining a performance cost in deploying the virtual appliance to different pairings of candidate host and storage subsystems. A host and storage subsystem pair is preferentially selected among the candidate pairings, a pairing of a host and storage subsystem with certain performance cost to satisfy performance requirements of the virtual appliance. Deployment planning may further involve deploying a virtual appliance on one or more appropriate spatially proximate hosts and storage subsystems that exhibit certain preferable connectivity and path capacity to satisfy the performance requirements of the virtual appliance.

18 Claims, 5 Drawing Sheets

(56) References Cited

U.S. PATENT DOCUMENTS

| | | | | |
|---|---|---|---|---|
| 7,433,300 | B1* | 10/2008 | Bennett | G06F 11/2005 370/216 |
| 7,444,415 | B1* | 10/2008 | Bazzinotti | H04L 12/4641 709/217 |
| 7,548,975 | B2* | 6/2009 | Kumar et al. | 709/226 |
| 7,649,892 | B2* | 1/2010 | McGee | H04L 47/10 370/395.4 |
| 7,650,427 | B1* | 1/2010 | Liu et al. | 709/238 |
| 7,778,183 | B2* | 8/2010 | Fan et al. | 370/238 |
| 7,870,360 | B2* | 1/2011 | Johnson et al. | 711/172 |
| 7,925,629 | B2* | 4/2011 | Webman et al. | 707/648 |
| 8,266,576 | B2* | 9/2012 | Lam et al. | 717/100 |
| 8,266,578 | B2* | 9/2012 | Bazigos et al. | 717/101 |
| 8,799,891 | B2* | 8/2014 | Cherkasova et al. | 718/1 |
| 8,892,676 | B2* | 11/2014 | Aszmann | G06F 3/0608 707/610 |
| 2002/0019908 | A1 | 2/2002 | Reuter et al. | |
| 2002/0069369 | A1* | 6/2002 | Tremain | 713/201 |
| 2003/0018813 | A1* | 1/2003 | Antes | H04L 63/0272 709/245 |
| 2003/0179707 | A1* | 9/2003 | Bare | H04L 12/185 370/235 |
| 2003/0200321 | A1* | 10/2003 | Chen | H04L 63/0272 709/229 |
| 2005/0228835 | A1 | 10/2005 | Roa | |
| 2007/0233810 | A1* | 10/2007 | Brownell | H04L 29/12009 709/218 |
| 2007/0294676 | A1* | 12/2007 | Mellor et al. | 717/139 |
| 2008/0004094 | A1* | 1/2008 | Mueller et al. | 463/1 |
| 2009/0164356 | A1* | 6/2009 | Bakman | 705/34 |
| 2009/0210869 | A1* | 8/2009 | Gebhart et al. | 717/174 |

OTHER PUBLICATIONS

Gibson, G. et al., Network Attached Storage Architecture, Comm. of the ACM, pp. 37-45, Nov. 2000, vol. 43, No. 11.

Lowell, D. et al., Devirtualization Virtual Machines Enabling General, Single-Node, Online Maintenance, ASPLOS '04, Oct. 9-13, 2004, pp. 211-223.

Nakajima, T., Pervasive Servers: A framework for creating a society of appliances, Pers Ubiquit Comput (2003), pp. 182-188.

Alpern, B. et al., PDS: A Virtual Execution Environment for Software Deployment, VEE '05, pp. 175-185, Jun. 11-12, 2005, Chicago, IL.

VMWare Inc., VMware: Virtualization Machine & Virtual Server Consolidation—VMware; http://www.vmware.com/, Feb. 27, 2008.

Barham, P. et al., Xen and the Art of Virtualization, In Proc. of ACM Symp. on Operating Systems Principles 2003, www.cl.cam.ac.uk/research/srg/netos/papers/2003-xensop.pdf.

VMTN—Virtual Appliance Marketplace, Virtual Appliances, VMware Appliance—VMware, http://www.vmware.com/vmtn/appliances//, Feb. 27, 2008.

Smith, B. et al., Provisioning Storage with an Expert Performance Advisor, Proc. Computer Measurement Group (CMG) 30th Annual Conf., Las Vegas NV, 2004.

* cited by examiner

METHOD AND SYSTEM FOR INTEGRATED DEPLOYMENT PLANNING FOR VIRTUAL APPLIANCES

BACKGROUND OF THE INVENTION

1. Field of the Invention

The invention relates to virtual appliances and in particular to integrated server-storage deployment planning for virtual appliances.

2. Background Information

Processing virtualization involves simulating several virtual machines (VMs), each running a separate operating system (OS) instance. Each OS may run in a different VM. For example, Xen is a virtual machine monitor (VMM), also known as a hypervisor, for managing the VMs that execute on a host operating system to provide the functionality of several guest operating systems on top of the host, on the same computer hardware (physical machine), at the same time. Virtualization technologies are becoming increasingly commonplace in data centers. These enable applications to be packaged inside virtual machines and allow multiple VMs to run on a single physical machine without interfering with each other. This provides increased utilization of resources and consolidation of server, space and data center costs.

With the increasing adoption of such virtualization technologies, software vendors are increasingly packaging their application stacks as virtual appliances (images or VM appliances) for ease of distribution and deployment. This represents a paradigm shift in software being packaged and distributed. Virtual appliances as fully pre-built, pre-configured and ready-to-run software application packaged with the operating system inside are aimed to eliminate the rising costs associated with installation, configuration and maintenance of complex software stacks.

Existing software distribution methods provide an online directory for certain virtual appliances where users can download applications packaged as ready-to-use virtual machines. Even though many of such virtual appliances are freewares themselves, a few software vendors are increasingly adopting this concept as a way to distribute their technologies more efficiently by packaging their software in virtual appliances.

In that regard, image management (i.e., a set of tools to create, manipulate, distribute and keep track of virtual appliances and images) is being recognized as central to achieving management simplification in such environments. Deploying virtual appliances requires careful planning to decide where to allocate the server and storage resources for a virtual appliance based on the current state and topology of a storage area network (SAN) and the needs of the virtual appliance (e.g., needs for CPU, memory, network bandwidth, etc., on the server side, size; and, performance requirements on the storage side and the estimated I/O throughput required between the server and storage). While VMs are becoming easier to migrate, storage migration is still expensive and hence finding a good initial placement for the storage volumes based on the workload requirements is important. Such integrated deployment planning is a challenging task and becomes more complex with increasing SAN sizes and large numbers of performance parameters. Further, manual allocation does not scale and leads to errors and under-utilization.

BRIEF SUMMARY OF THE INVENTION

The invention provides a method and system for integrated server-storage deployment planning for virtual appliances. One embodiment involves determining a performance cost in deploying the virtual appliance to different pairings of candidate host and storage subsystems.

A host and storage subsystem pair is preferentially selected among the candidate pairings, a pairing of a host and storage subsystem with certain performance cost to satisfy performance requirements of the virtual appliance.

Deployment planning may further include deploying a virtual appliance on one or more appropriate spatially proximate hosts and storage subsystems that exhibit certain preferable connectivity and path capacity to satisfy the performance requirements of the virtual appliance.

These and other features, aspects and advantages of the invention will become understood with reference to the following description, appended claims and accompanying figures.

DETAILED DESCRIPTION OF THE INVENTION

The invention provides a method and system for integrated server-storage deployment planning for virtual appliances. One embodiment involves deployment planning of virtual appliances in a storage area network (SAN) data center by integrating (combining) server resource vector matching with SAN topology, dynamic connectivity and performance-based storage volume allocation.

The integrated deployment planning allows deployment of virtual appliances and their storage volumes on appropriate spatially proximate physical servers and storage subsystems that exhibit certain preferable connectivity and path capacity so as to satisfy the performance requirements of the virtual appliances to be deployed thereto.

Figure 1:
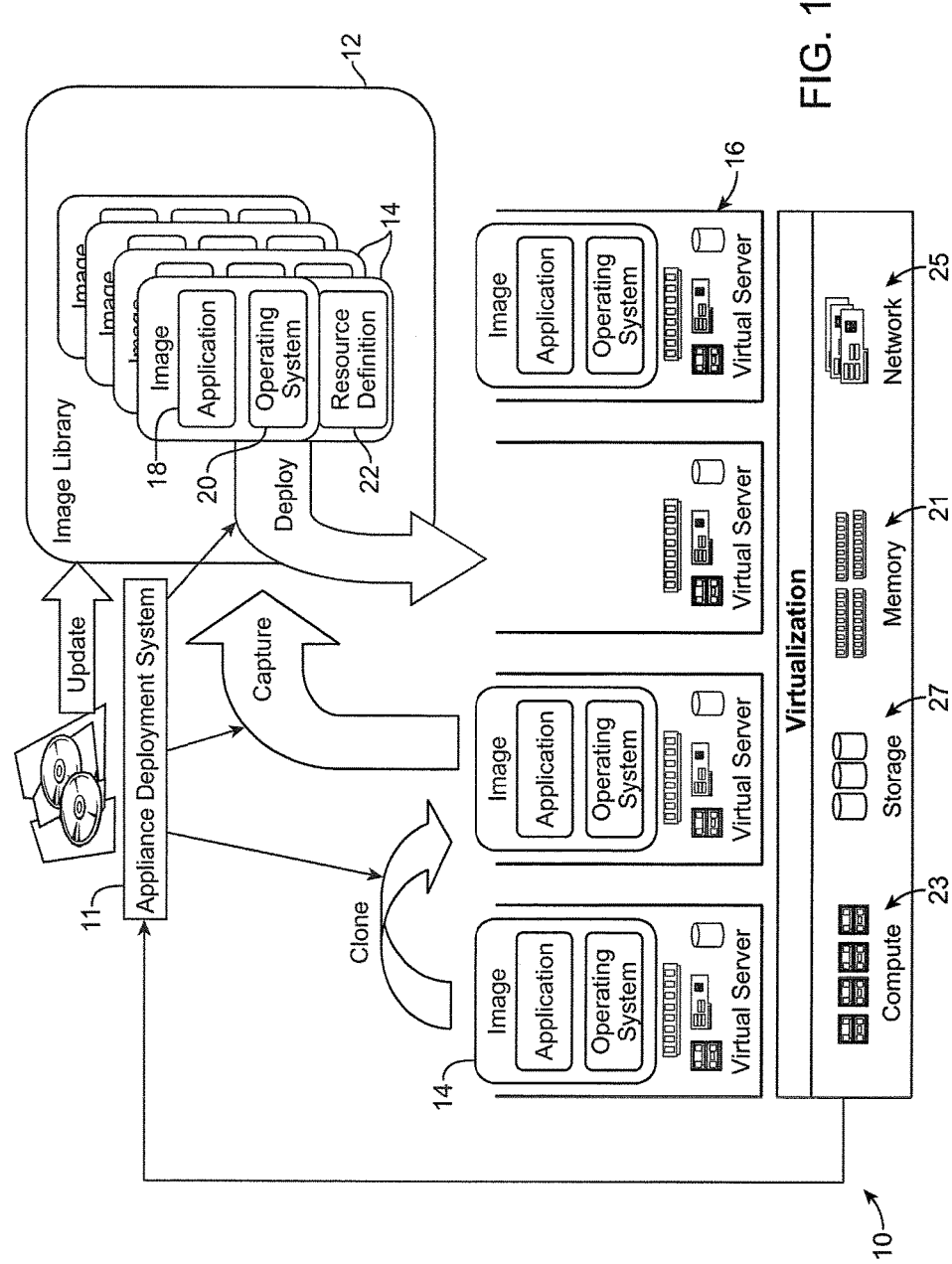
FIG. 1 shows a system architecture implementing integrated deployment planning for virtual appliances, according to an embodiment of the invention.

FIG. 1 shows an example computing environment 10 including a library 12 for virtual appliances (or images) 14. The virtual appliances 14 can be cloned from one running instance on a server 16 to another, or can be captured from a running instance on a server 16 and saved into the library 12, or can be deployed from the library 12 onto a new server 16. Depending on the needs of a virtual appliance 14, the deployment may also require creation of storage volumes (e.g., database, logs, etc.) of an appropriate size and capability. An appliance deployment system 11 implements integrated deployment planning for virtual appliances, according to an embodiment of the invention.

Figure 2:
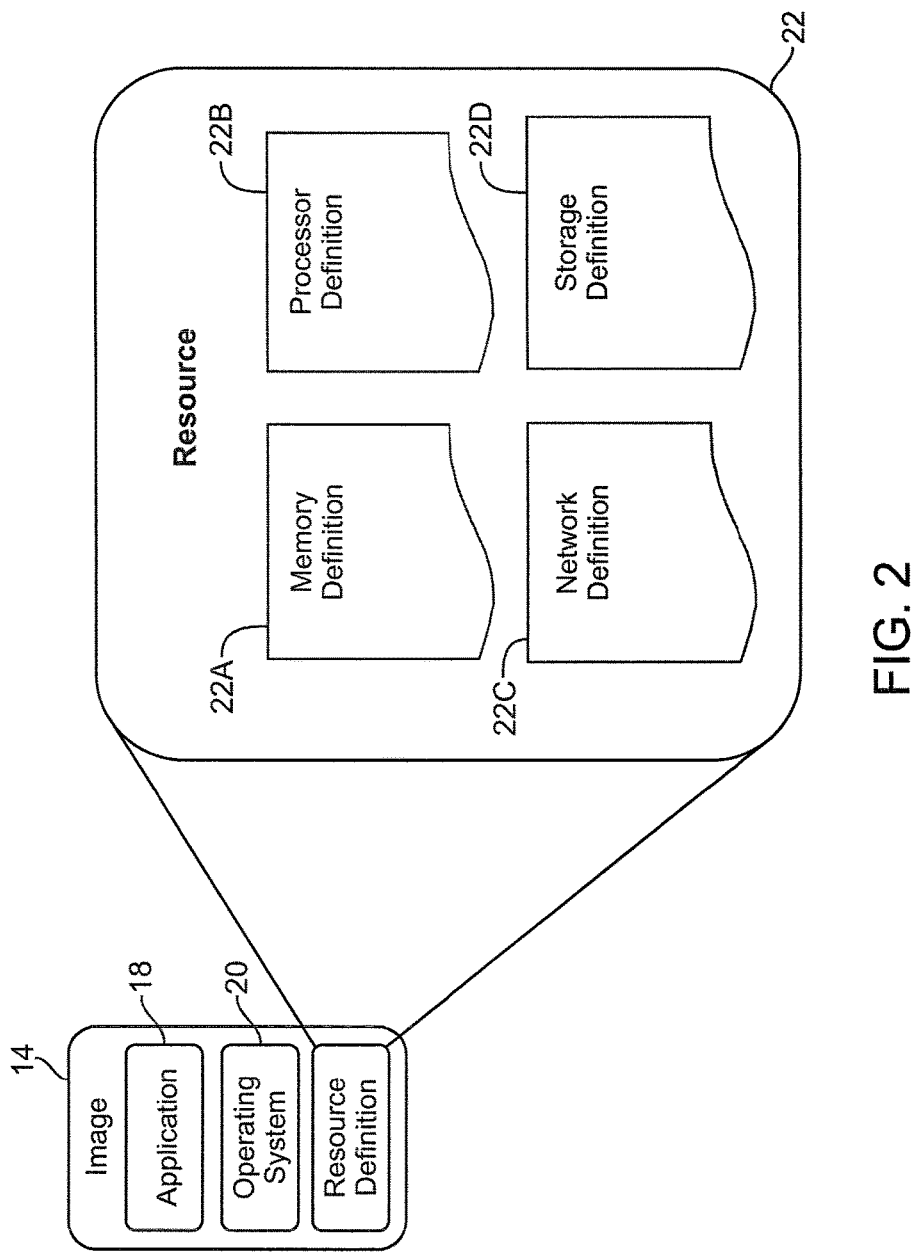
FIG. 2 shows an example Resource Definition for a virtual appliance, according to an embodiment of the invention.

Each virtual appliance 14 includes application software 18, an operation system 20 and may include a Resource Definition File (RDF) 22 which specifies the resources needed by that appliance 14. FIG. 2 shows an example Resource Definition 22, including: a memory definition 22A, a processor definition 22B, a network definition 22C and a storage definition 22D. The memory definition 22A indicates requirements for memory 21. The processor definition 22B indicates requirements for a processor 23. The network definition 22C indicates requirements for the network bandwidth 25. The storage definition 22D indicates requirements for the storage 27.

The Resource Definition File 22 captures the resource requirements for the appliance 14 (on the server side 16 and the storage side 27 in FIG. 1). An example candidate set of parameters represented by the Resource Definition 22 for the virtual appliance on the server side 16 include: the amount of CPU processing required; the amount of memory required; the amount of network bandwidth required, etc. These parameters are in the same units as the capacities on physical servers for the same resource, such that a direct comparison can be made therebetween. The parameters can be obtained based on one or more of: user-input, predefined template workloads, monitoring other appliances already running in the system, a combination of the above with user provided modification.

For the storage-side 27, an example candidate set of parameters represented by the Resource Definition 22 includes: size (in GBs) of storage space required for the appliance workload; minimum and maximum volume size for volumes to be created; storage subsystem (e.g., IBM ESS, IBM DS8000, EMC Clarion etc) preference or subsystem type preference; I/O Demand (I/Os per second per GB); average transfer size (in KBs per second); sequential versus random, read versus write percentage mix of I/O; cache utilization-percent of hits/misses for reads and writes; peak activity time, etc.

Alternately, the storage-side parameters can also be specified in terms of predefined workload templates, including: online transaction processing (OLTP) Standard, for general Online Transaction Processing Environment; OLTP High, for higher demand OLTP applications; Data Warehouse, for data warehousing applications; Batch Sequential, for batch applications accessing data sequentially; Document Archival, for archival applications, write-once, read-infrequently, etc.

For server-storage connectivity, the above parameters (e.g., I/O demand, average transfer size) allow determining Data Transfer Bandwidth (in megabits per second) and Command Throughput (in I/O operations per second) required between the server 16 and storage 33 nodes for the workload. These in turn translate to capacity requirements on the path from the server (host) 16 to the storage 27.

Figure 3:
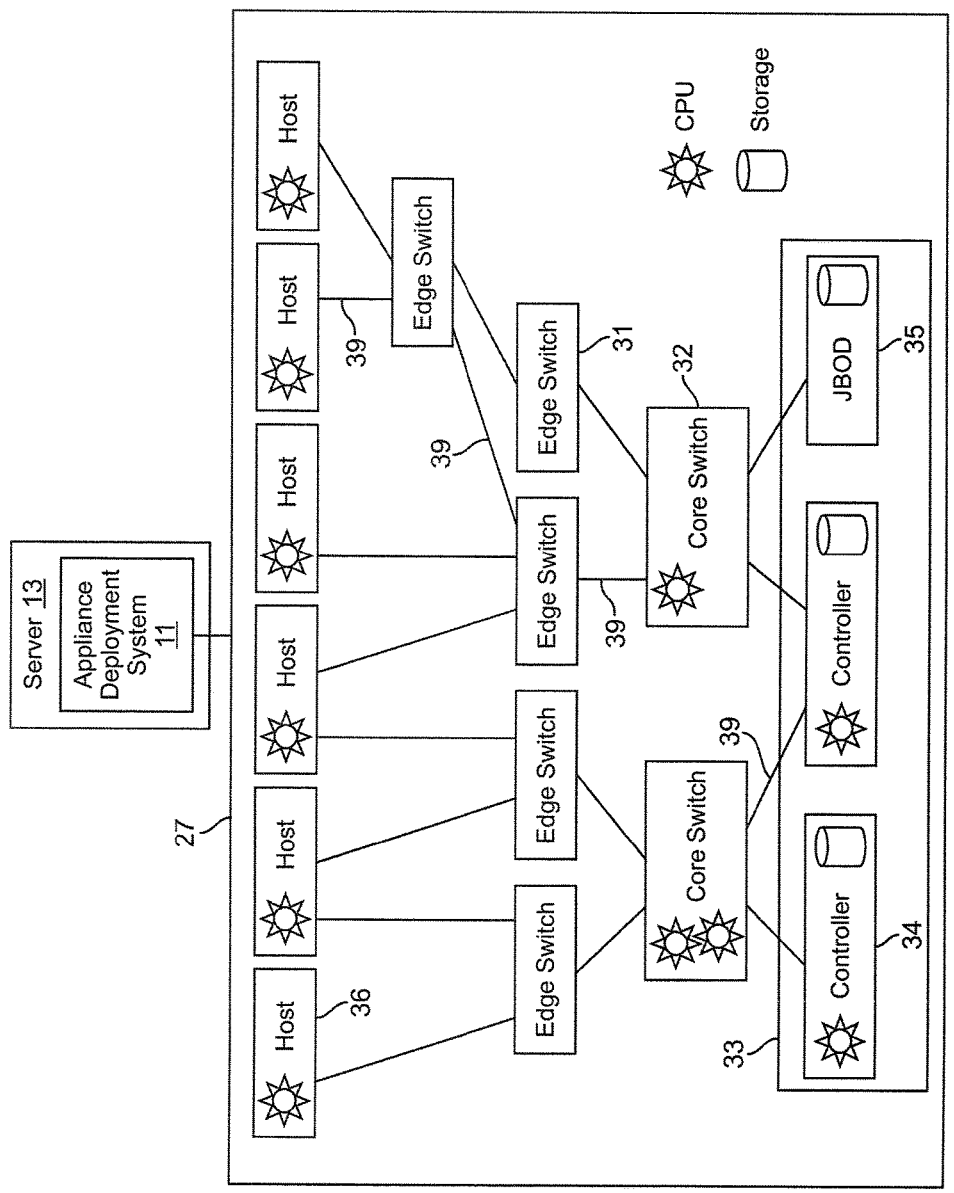
FIG. 3 shows an example network of hosts and storage subsystems implementing integrated deployment planning for virtual appliances, according to an embodiment of the invention.

FIG. 3 shows an example of the storage 27 as a SAN including hosts (servers) 36, and switches 31, 32, connecting the hosts 36 to storage a component 33 including storage controllers (i.e., subsystems) 34 and storage volumes 35. An example appliance deployment system 11 is shown running on a server 13. The controllers 34 and switches 31, 32 may include CPU resources for executing virtual appliances. Further, due to the varying capabilities of the path switches 31, 32, and links 39, different host-storage node pairs (36, 33) can have different latencies and capacities between them.

As such the deployment servers must be properly selected to meet the requirements of the virtual appliance. Appliance applications 18 with high data rate requirements may benefit by executing on spatially proximate servers (CPUs) 36 and storage subsystems 33 (FIG. 3).

Figure 4:
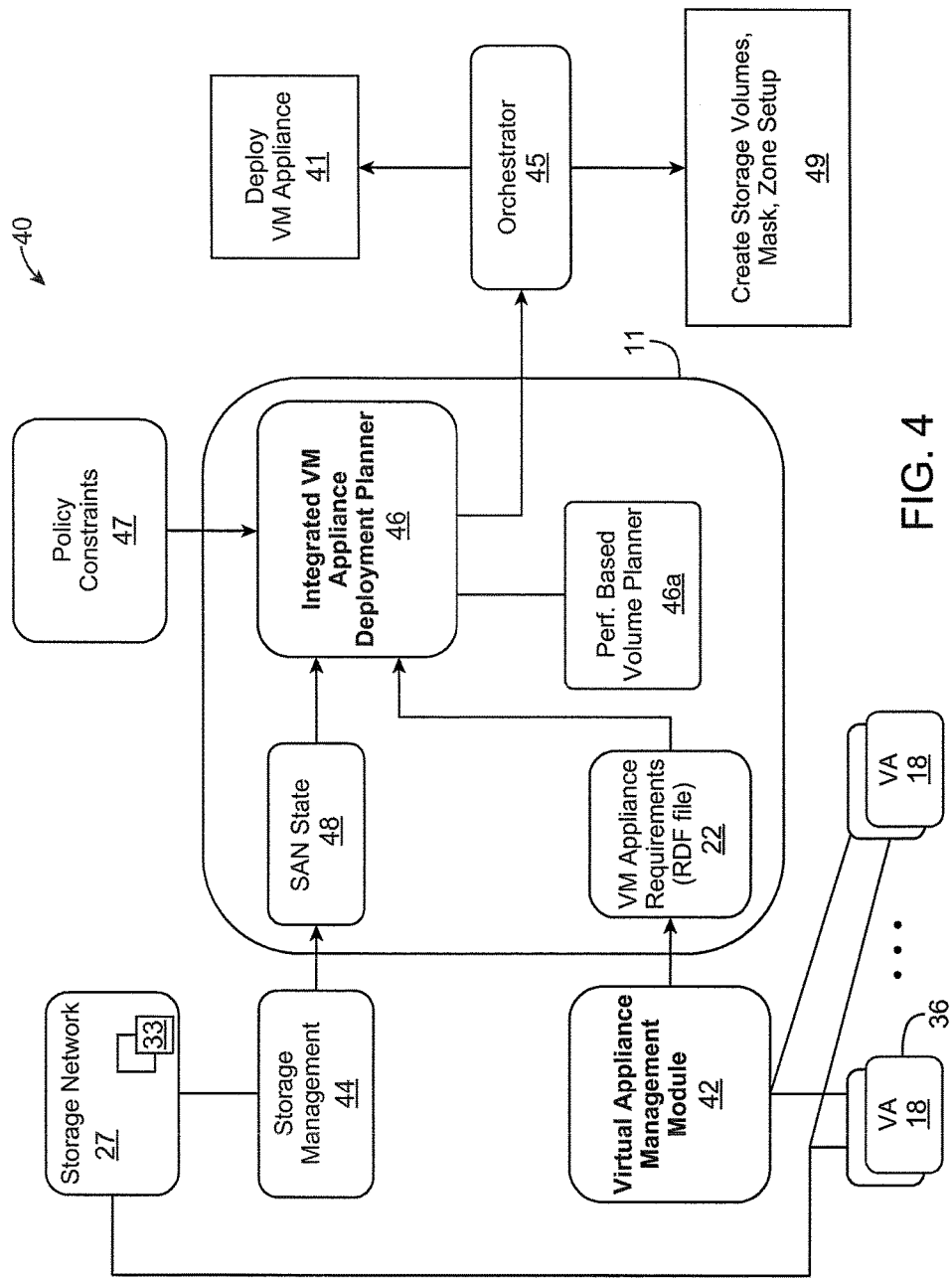
FIG. 4 shows an example functional block diagram for an integrated planning system including an appliance deployment system.

FIG. 4 shows an example architecture for an integrated planning system 40 including the appliance deployment system 11, according to an embodiment of the invention. The integrated planning system 40 uses a SAN management software module 44 (such as IBM TPC 3.3+, EMC Control Center 6.0+) to gather a current state 48 of the SAN 27 including topology, configuration and dynamic performance data at the different nodes of the SAN 27. A policy constraints module 47 may specify auxiliary constraints such as "Appliances of this form can go only on nodes of this type etc.", which may cause filtering of certain nodes from consideration. Other constraints may be of the form "Appliances X and Y cannot be on the same node", etc.

A virtual appliance management module 42 determines virtual appliance requirements (RDF) by monitoring virtual appliances 18. The appliance deployment system 11 includes a VM appliance deployment planner 46 implementing integrated deployment planning for virtual appliances 18.

Modern storage controllers (e.g., IBM ESS, IBM DS6000, IBM DS8000, EMC CLARiiON, etc.) have complex internal structures with ranks, pools, device adapters, process complexes, etc., with interdependencies. For example, an overloaded device adapter can adversely affect the performance of all storage volumes in any of the ranks/pools below it. As such, when allocating new storage volumes in a storage subsystem 33, considering the impact of existing workloads on the various internal components of the subsystem 33 is important. SAN management tools 44 monitor these components continuously and provide dynamic performance parameters for such components as SAN state 48. Such parameters may include:

Fiber Channel (FC) port: {Read/Write} I/O rate, KB rate, Service Time.

RAID ranks/pools/device adapters: {Read/Write} I/O rate, KB rate, Service Time.

Storage Volumes: {Read/Write} I/O rate, I/O Cache Hit rate. Service Time in addition to the space used and available on each subsystem.

Based on these performance parameters and workload storage requirements based on RDF 22, a volume planner 46a (FIG. 4) determines where in a subsystem 33 to allocate storage volumes for workload of a VM appliance 18 so as to meet the throughput and bandwidth requirements for the storage workload without overloading any of the components in the subsystem 33. Such a volume planner 46a can comprise a performance-based volume planner. Examples of such a volume planner may be found in Provisioning Storage with an Expert Performance Advisor," by Brian J. Smith, John Aschoff, Stefan Jaquet, Computer Measurement Group's (CMG) 30th International Conference, Las Vegas, Nev., 2004; and, IBM Redbooks: Volume Performance Advisor in TPC 3.1 and Storage Planner in TPC 3.3; incorporated herein by reference.

Figure 5:
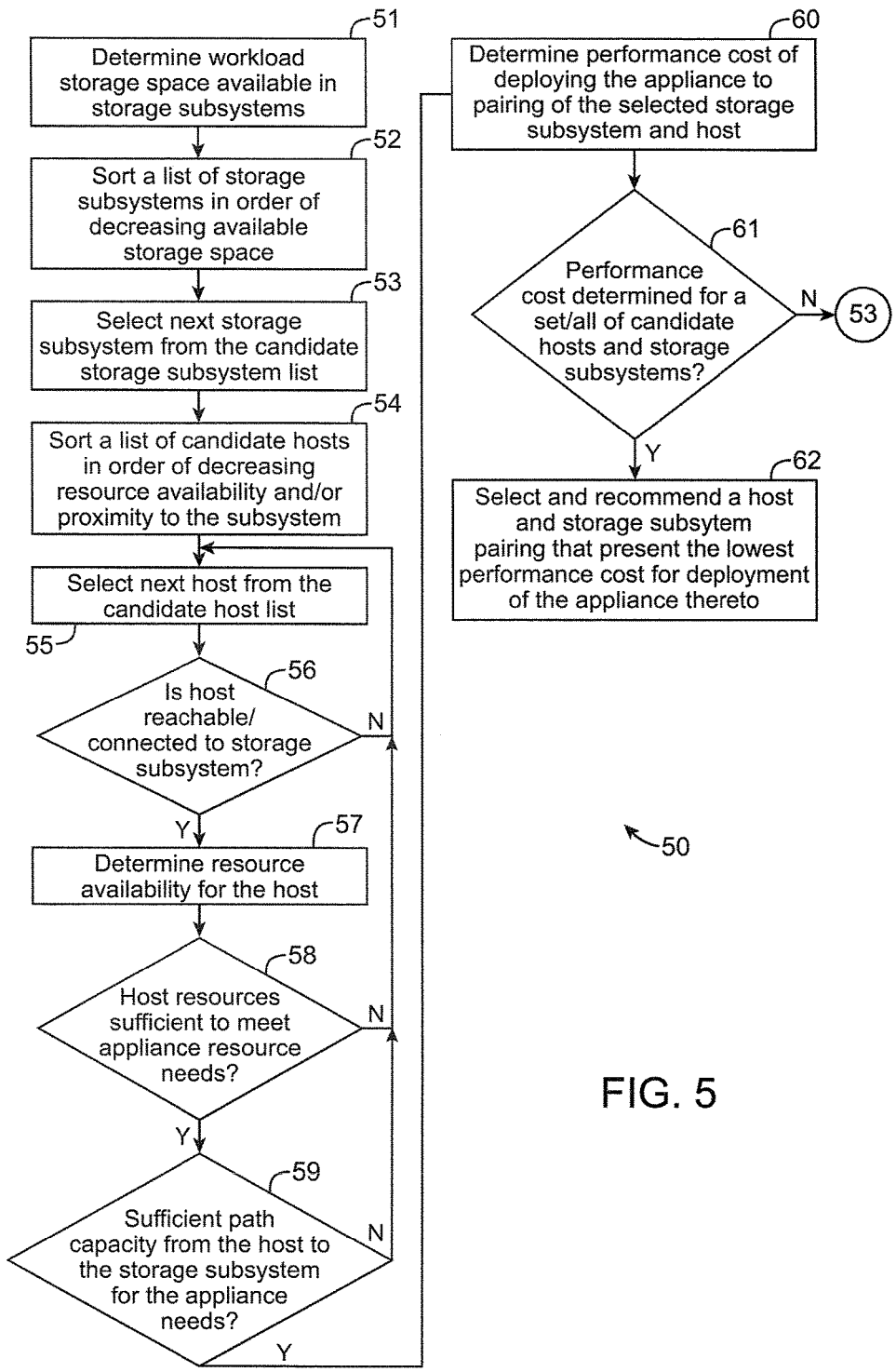
FIG. 5 shows a flowchart of the steps of an integrated deployment process implemented appliance deployment system, according to an embodiment of the invention.

Referring to FIG. 5, the VM appliance deployment planner 46 implements a process 50 for integrating server resource vector matching with SAN topology, dynamic connectivity and performance-based volume allocation, according to the following steps:

Step 51: Determine workload storage space available in storage subsystems 33. Specifically, for each storage subsystem 33 with available storage space greater than storage space required by a VM appliance 18, determine Gap(S_A) according to relation (1) below:

$$Gap(S\_A) = VolumePlanner\_SpaceGapBelowPerfThreshold$$

$$(S\_A, W, T=100),\qquad(1)$$

wherein Gap(S_A) provides the amount of the new workload storage space (e.g., in gigabytes) that can be placed in a storage subsystem S_A. W is the workload (the storage load) of the appliance. In additional embodiments, Gap(S_A) provides the amount of the new workload storage space (e.g., in gigabytes) that can be placed in a storage subsystem S_A without causing the performance load in subsystem components (e.g., ranks, pools, device adapters, host adapters, etc.) exceeding a threshold T %. Thus, both the storage space and performance considerations contribute to the Gap calculation. A storage subsystem with critically overloaded internal components (e.g., a device adapter) would have a Gap value of zero even though the storage subsystem may posses a larger quantity of available space. As such, the performance-based volume planner estimates the Gap value by taking into account: the current loads on the various components in the subsystem, and the demands of the new workload for a VM appliance.

Step 52: Sort a list of storage subsystems in order of decreasing SpaceGapBelowPerfThreshold. Specifically, a list of candidate storage subsystems 33 is ordered in decreasing order of Gap(S_A).

Step 53: Select the next storage subsystem from the candidate storage subsystem list.

Step 54: Optionally, a list of candidate host (physical server) 36 is sorted in order of decreasing resource availability and/or proximity to the subsystem 33.

Step 55: Select a next candidate host (physical server) 36 from the candidate host list, in order of resource availability and/or proximity to the subsystem 33.

For the selected storage subsystem and host pair, determine steps 56-59, below:

Step 56: Determine if the host 36 is reachable/connected to the storage subsystem? If not, proceed back to step 55.

Step 57: Determine resource availability information for the host, including: amount of CPU used, available; amount of memory used, available; amount of network bandwidth used, available; and any other parameters specified in the RDF 22.

Step 58: Does the host resource availability information indicate that host resources are sufficient to meet the resources required for the VM appliance 18? If not, go back to step 55.

Step 59: Does the host resource availability information indicate that the path capacity from the host to the storage subsystem is below the workload requirements VM appliance? If yes, go back to step 55.

Step 60: Determine performance cost of deploying the VM appliance to pairing of the selected storage subsystem and host, for execution. Specifically, compute a Cost function according to relation (2) below as:

$$\text{Cost}(S\_A, H\_B) = f(T, \text{latency}(S\_A, H\_B), \quad (2)$$

wherein S_A is a storage subsystem 33, H_B is a host 36, T is the maximum performance threshold that would be reached on any components (e.g., ranks, pools, device adapters, host adapters) of the subsystem S_A, or a host H_B parameters, or the path capacity between S_A and H_B, if the virtual appliance 18 and its storage volumes were deployed on the host H_B and the storage subsystem S_A. One example Cost function is according to relation (3) below:

$$f = T * \text{latency}(S\_A, H\_B), \quad (3)$$

wherein if deployment (assignment) of a VM appliance 18 to the pairing of subsystem S_A and host H_B (e.g., a first node pair), causes one of the above quantities (i.e., performance parameters on the storage subsystem internal components, or the host, or on the nodes therebetween) to go to, e.g., 90%, then T is set accordingly. If another node pair (e.g., a second node pair) reaches a lower threshold T, e.g. 50%, then the second node pair has a lower associated Cost than the first node pair, and hence is more preferable than the first pair for deploying the VM appliance 18 to. Similarly, if a node pair S_A and H_B are spatially proximate, providing lower latency, that the node pair has a lower Cost than node pairs that are further apart.

Step 61: The above process steps 53-60 are repeated to determine Cost values for a set (preferably all) of candidate storage subsystems and hosts (node pairs S_A and H_B) that the VM appliance 18 may potentially be deployed to.

Step 62: Based on the computed Cost for the host and storage subsystem candidate pairs above, select a candidate storage subsystem and host (S_A and H_B) with the least Cost as the recommendation for deploying the VM appliance 18 to. Other Cost functions and orderings of hosts and subsystems may be used.

The recommendation from the VM appliance deployment planner 46 may be provided to an administrator. The administrator can either accept the recommendation or make additional additions, removals and ask for another recommendation. Once accepted, the recommendation can be provided to an orchestrator 45 (FIG. 4) for execution as deployment of the VM appliance 18 to the recommended pair of storage subsystem and host. The orchestrator 45 can use a VM image management tool 41 to deploy the VM appliance 18, and a volume creation tool 49 to create the required storage volume for the VM appliance 18 and set up the appropriate zoning and masking.

The integrated deployment planning allows deployment of virtual appliances and their storage volumes on appropriate spatially proximate physical servers and storage subsystems that exhibit certain preferred connectivity and path capacity so as to satisfy the performance requirements of the virtual appliances.

As is known to those skilled in the art, the aforementioned example architectures described above, according to the invention, can be implemented in many ways, such as program instructions for execution by a processor, as computer implemented instructions, as computer program product, as logic circuits, as an application specific integrated circuit, as firmware, etc. The invention has been described in considerable detail with reference to certain preferred versions thereof; however, other versions are possible. Therefore, the spirit and scope of the appended claims should not be limited to the description of the preferred versions contained herein.

What is claimed is:

1. A method for integrated server-storage deployment planning for virtual appliances, comprising:
   using a hardware processor for determining a performance latency cost for deploying the virtual appliance to different pairings of candidate host and storage subsystems based on:
   determining resource availability using resource requirements obtained from each virtual appliance and available workload storage space for each storage subsystem, and determining a performance function by determining a maximum latency reachable for: any components of a candidate storage subsystem, parameters for a candidate host or path capacity between the candidate storage subsystem and the candidate host;

using the performance function to determine performances for deployment of each virtual appliance for execution with the different pairings of candidate host and candidate storage subsystems;

using the hardware processor for selecting among the candidate pairings, a particular pairing of a host and storage subsystem with a least performance latency to satisfy performance requirements of the virtual appliance by comparing performance latencies obtained from the performance function for deployment of each virtual appliance;

generating a recommendation for deploying the virtual appliance to the particular pairing of the host and storage subsystem;

deploying, by the hardware processor, the virtual appliance to the particular pairing of the host and storage subsystem; and creating, by the hardware processor, a required storage volume for the virtual appliance and setting up zoning and masking for the virtual appliance.

2. The method of claim 1, wherein the least performance latency is based on satisfying processing and volume access requirements of the virtual appliance.

3. The method of claim 1, wherein determining a performance latency further includes, for each candidate host and storage subsystem pair, determining storage volume connectivity, spare path capacity or storage volume connectivity and spare path capacity between the host and storage subsystem, to satisfy the requirements of the virtual appliance.

4. The method of claim 3, wherein determining a performance latency further includes, for each candidate host and storage subsystem pair, determining access latency from the host to appliance-required storage volumes in the storage subsystem.

5. The method of claim 1, further comprising determining available candidate host and storage subsystem pairs for deployment of the virtual appliance.

6. The method of claim 5, wherein determining candidate host and storage subsystem pairs further includes:
selecting storage subsystems that possess space and performance capacity available to meet the storage requirements of the virtual appliance; and
selecting hosts that possess resource availability to meet resource requirements of the virtual appliance.

7. The method of claim 6, wherein selecting a storage subsystem includes utilizing a performance-based volume planner to determine the amount of additional appliance workload that can be deployed on the storage subsystem without a performance load of the subsystem's internal components exceeding the performance threshold.

8. The method of claim 6, wherein selecting hosts includes selecting hosts that possess resource availability in processing, memory and network bandwidth.

9. The method of claim 1, further comprising determining performance requirements of virtual appliances based on monitoring the virtual appliances running in a system.

10. A computer program product for integrated server-storage deployment planning for virtual appliances, the computer program product comprising a non-transitory computer readable storage medium having program instructions embodied therewith, wherein the program instructions executable by a processor to cause the processor to:

determine, by the processor, a performance latency for deploying a virtual appliance to different pairings of candidate host and storage subsystems based on:
determining resource availability using resource requirements obtained from each virtual appliance and available workload storage space for each storage subsystem, and
determining a performance function by determining a maximum latency reachable for: any components of a candidate storage subsystem, parameters for a candidate host or path capacity between the candidate storage subsystem and the candidate host;

use, by the processor, the performance function to determine performances for deployment of each virtual appliance for execution with the different pairings of candidate host and candidate storage subsystems;

select, by the processor, among the candidate pairings, a particular pairing of a host and storage subsystem with a least performance latency to satisfy performance requirements of the virtual appliance by comparing performance latencies obtained from the performance function for deployment of each virtual appliance;

generate, by the processor, a recommendation for deploying the virtual appliance to the particular pairing of the host and storage subsystem;

deploy, by the processor, the virtual appliance to the particular pairing of the host and storage subsystem; and create, by the processor, a required storage volume for the virtual appliance and setting up zoning and masking for the virtual appliance.

11. The computer program product of claim 10, wherein the least performance latency is based on satisfying processing and volume access requirements of the virtual appliance.

12. The computer program product of claim 10, wherein determining a performance currently amended latency further includes, for each candidate host and storage subsystem pair, determining storage volume connectivity, spare path capacity, or storage volume connectivity and spare path capacity between the host and storage subsystem, to satisfy the requirements of the virtual appliance.

13. The computer program product of claim 12, wherein determining a performance latency further includes, for each candidate host and storage subsystem pair, determining access latency from the host to appliance-required storage volumes in the storage subsystem.

14. The computer program product of claim 10, wherein the program instructions executable by the processor further cause the processor to: determine, by the processor, candidate host and storage subsystem pairs for deployment of the virtual appliance.

15. The computer program product of claim 14, wherein determining candidate host and storage subsystem pairs further includes:
selecting storage subsystems that possess sufficient space and performance capacity available to meet the storage requirements of the virtual appliance; and
selecting hosts that possess sufficient resource availability to meet resource requirements of the virtual appliance.

16. The computer program product of claim 15, wherein selecting a storage subsystem includes utilizing a performance-based volume planner to determine the amount of additional appliance workload that can be deployed on the storage subsystem without a performance load of the subsystem's internal components exceeding the performance threshold.

17. The computer program product of claim 15, wherein selecting hosts includes selecting hosts that possess sufficient resource availability in processing, memory and network bandwidth.

18. The computer program product of claim 10, wherein the program instructions executable by the processor further cause the processor to: determine, by the processor, performance requirements of a virtual appliance based on predefined template workloads for the virtual appliance.

* * * * *